M. T. DUFFY.
COOKING UTENSIL.
APPLICATION FILED MAR. 25, 1910.

975,843.

Patented Nov. 15, 1910.

Witnesses
M. L. Lessin
B. G. Richards

Inventor
Matthew T. Duffy
By Joshua R. H. Potts
His Attorney

UNITED STATES PATENT OFFICE.

MATTHEW T. DUFFY, OF CHICAGO, ILLINOIS.

COOKING UTENSIL.

975,843.  Specification of Letters Patent.  Patented Nov. 15, 1910.

Application filed March 25, 1910. Serial No. 551,462.

*To all whom it may concern:*

Be it known that I, MATTHEW T. DUFFY, a citizen of the United States, residing at Chicago, county of Cook, and State of Illinois, have invented certain new and useful Improvements in Cooking Utensils, of which the following is a specification.

My invention relates to improvements in cooking utensils and has for its object the provision of a cooking utensil of improved construction and operation.

The invention consists in the combination and arrangement of parts hereinafter described and claimed.

Figure 1:
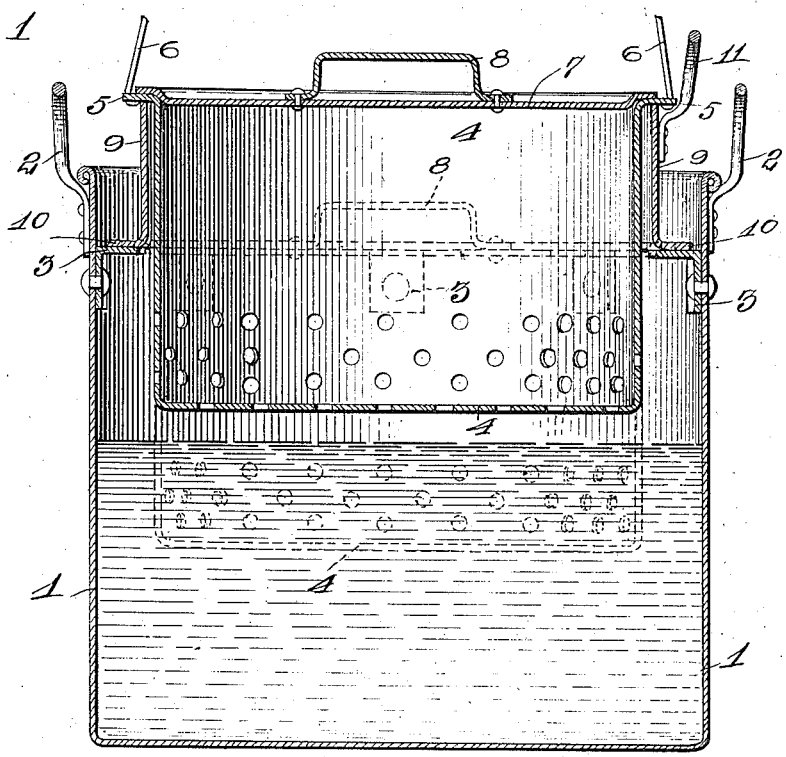
Figure 2:
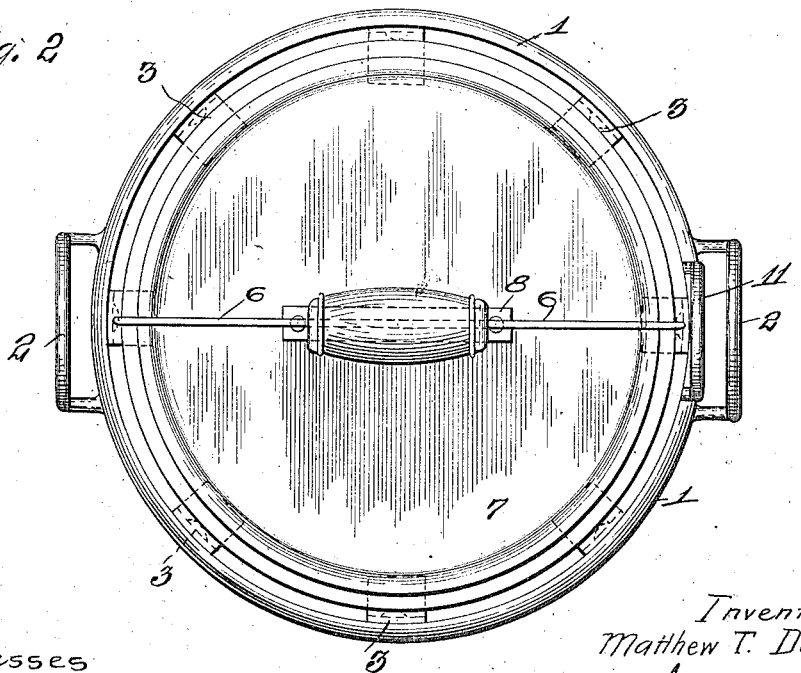

The invention will be best understood by reference to the accompanying drawings forming a part of this specification, and in which, Figure 1 is a vertical section of a cooking utensil embodying my invention, and Fig. 2, a top plan view of the same.

The preferred form of construction as illustrated in the drawings comprises an outer boiler 1 having supporting handles 2 at its upper edge. Supporting brackets 3 are secured to the interior of boiler 1 near its upper edge. A foraminated food containing vessel 4 is provided with an outwardly extending flange 5 at its upper edge, the said flange being adapted to rest upon the supporting brackets 3 and suspend said vessel in boiler 1, as indicated in dotted lines in Fig. 1. Vessel 4 is also provided with a bail or handle 6 secured to flange 5 and by means of which said vessel may be carried. Vessel 4 is also provided with a cover 7 having a handle 8 for manipulation of the same. The cylindrical supporting member 9 is provided at its lower edge with an outwardly extending flange 10 adapted to rest upon supporting brackets 3 and is also provided at its upper edge with a handle 11 for manipulation of the same.

In use, when it is desired to boil articles of food, they are placed in vessel 4 which is then inserted in boiler 1 with its flange 5 resting upon supporting brackets 3 and its lower portion immersed in the water in said boiler. When it is desired to steam articles of food, the supporting member 9 is placed on brackets 3 and vessel 4 inserted therethrough into boiler 1 with flange 5 resting upon the upper edge of member 9 and in which position vessel 4 is suspended above the water in boiler 1, as illustrated in full lines in Fig. 1.

While I have illustrated and described the preferred construction for carrying my invention into effect, this is capable of variation or modification without departing from the spirit of the invention. I therefore do not wish to be limited to the exact details of construction set forth but desire to avail myself of such variations and modifications as fairly fall within the scope of the appended claims.

Having described my invention what I claim as new and desire to secure by Letters Patent is:

1. In a cooking utensil, the combination of a boiler, stops secured to the interior of said boiler near its top; a removable supporting member arranged to rest upon said stops; and a foraminated food vessel of a size to pass said stops but provided at its upper end with an outwardly extending flange of a size to rest either upon said removable supporting member or upon said stops, substantially as described.

2. In a cooking utensil, the combination of a boiler; brackets secured to the interior of said boiler near its top; a cylindrical supporting member having a flange at its lower edge adapted to rest upon said brackets; and a foraminated food containing vessel having a flange at its upper edge adapted to rest upon said brackets or upon the upper edge of said supporting member, substantially as described.

In testimony whereof I have signed my name to this specification in the presence of two subscribing witnesses.

MATTHEW T. DUFFY.

Witnesses:
HELEN F. LILLIS,
JOSHUA R. H. POTTS.